United States Patent [19]

Oswald et al.

[11] 4,434,062

[45] Feb. 28, 1984

[54] OIL DISPLACEMENT ENHANCED BY LYOTROPIC LIQUID CRYSTALS IN HIGHLY SALINE MEDIA

[75] Inventors: Alexis A. Oswald, Mountainside; Helen Huang; John Huang, both of East Brunswick; Paul Valint, Jr., Woodbridge, all of N.J.

[73] Assignee: Exxon Research and Engineering Co., Florhan Park, N.J.

[21] Appl. No.: 222,137

[22] Filed: Jan. 2, 1981

Related U.S. Application Data

[63] Continuation of Ser. No. 47,641, Jun. 11, 1979, abandoned.

[51] Int. Cl.³ .............................................. E21B 43/22
[52] U.S. Cl. .............................. 252/8.55 D; 166/274; 166/275
[58] Field of Search ................... 252/8.55 D; 166/273, 166/274, 275

[56] References Cited

U.S. PATENT DOCUMENTS

| | | | |
|---|---|---|---|
| 2,778,814 | 1/1957 | Behrens et al. | 260/98 |
| 3,827,497 | 8/1974 | Dycus et al. | 166/274 |
| 4,090,969 | 5/1978 | Koch et al. | 252/8.55 |

FOREIGN PATENT DOCUMENTS 921690  11/1968  Canada .................................. 166/275

OTHER PUBLICATIONS

M. H. Akstinat, Dissertation TU Clausthal, Oct. 26, 1978, pp. 113–117, 133–137 and 168–169.
W. J. Benton, R. Hwan, C. A. Miller and T. Fort, Jr., 3rd ERDA Symposium on Enhanced Oil Recovery, Tulsa, Aug., 1977, pp. A-9/1 to A-9/7.
Griffin, Article in *Journal of the Society of Cosmetic Chemists*, vol. 1, 1949, pp. 311–315; 325 and 326.
Hwan et al., Proceedings of ERDA Symposium on Enhanced Oil Recovery, Tulsa, OK, Sep. 1976, preprint B-4.

*Primary Examiner*—Herbert B. Guynn
*Attorney, Agent, or Firm*—James H. Takemoto; Henry E. Naylor

[57] ABSTRACT

Liquid crystals are used in place of microemulsions in a process for chemically enhanced oil recovery. The liquid crystals compositions contain ethoxylated surfactants having appropriately balanced hydrophilic-lipophilic properties. These compositions result in a faster and greater recovery of crude oil as compared to microemulsions.

26 Claims, 5 Drawing Figures

OIL RECOVERY BY LIQUID CRYSTALS AND MICROEMULSION

BASED ON COMBINED QUATERNARY AMMONIUM SULFONATE SURFACTANT

| EXP. NO. | PHASE | SYMBOL | COMPOSITION % | | | ETHOX. X + Y |
|---|---|---|---|---|---|---|
| | | | TSB | OIL | (SURF.) | |
| I | 1c | ▲ | 50 | 50 | 12 | 7.5 |
| II | 1c | □ | 93 | 7 | 3 | 7.0 |
| III | me | ● | 93 | 7 | 2 | 7.5 |

OIL RECOVERY BY LIQUID CRYSTALS BASED ON DIFFERENT COMBINED SURFACTANTS

I - $n = 12$    $R = H$    $X + Y = 6$   $(5 + 7)$
II - $n = 18$    $R = CH_3$    $X + Y = 9.3$   $(9 + 10)$

| No. | SYMBOL | COMPOSITION | | | VISCOSITY |
|---|---|---|---|---|---|
| | | TSB % | OIL % | SURF. pph | cP $(7.3\ SEC^{-1})$ |
| I | ● | 92 | 8 | 2.4 | 18 |
| II | ▲ | 93 | 7 | 3 | 11 |

OIL RECOVERY BY LIQUID CRYSTALS BASED ON DIFFERENT HYDROCARBONS

I, II } n-DECANE (D)  x + y = 8

III { DISTILLED LOUDON CRUDE OIL (O) }  x + y = 9.1 (5 + 10)

| No. | SYMBOL | COMPOSITION HYDROCARBON TYPE | % TSB | SURF. pph | VISCOSITY, cP (SEC$^{-1}$) (1.6) | (8) |
|---|---|---|---|---|---|---|
| I | ● | D | 7 | 93 | 2 | — | 10 |
| II | ▲ | D | 9.5 | 90.5 | 3.8 | 100 | 48 |
| III | ■ | O | 10 | 90 | 3.8 | 114 | 56 |

OIL RECOVERY BY LIQUID CRYSTAL (LC)
VERSUS MICROEMULSION (me)
BOTH BASED ON A MIXTURE OF SODIUM SULFONATE SALTS
3% PETROSTEP 465 PETROLEUM SULFONATE (1.7% ACTIVE)
7% EOR-200 ETHYOXYLATED SULFONATE (2% ACTIVE)
2% n-PENTANOL + 88% AQUEOUS NaCl

| SEQ. No. | PHASE | SYMBOL | NaCl CONC. IN BRINE, % | VISCOSITY cP (~8 sec$^{-1}$) |
|---|---|---|---|---|
| I | LC | ▲ | 5 | 20 |
| II | me | ● | 2 | 16 |

FIGURE 5
PHOTOMICROGRAPHS OF TRANSLUCENT AND BIREFRINGENT LIQUID CRYSTAL MIDDLE PHASES

Phases Separated by Centrifugation at 27000 G and 25°C of Mixtures of Equal Volumes of Distilled Loudon Crude Oil and Brines of Varying Salt Concentrations plus 4 parts per Hundred of the Combined Surfactant,

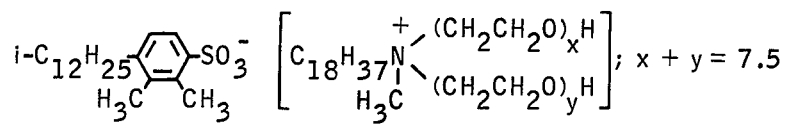

; $x + y = 7.5$

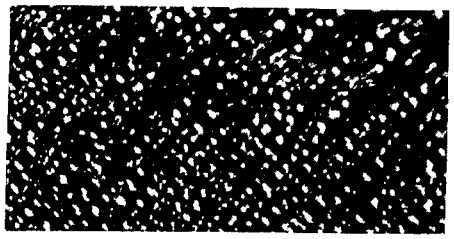

A: 10% TSB - Crossed Polars
128x

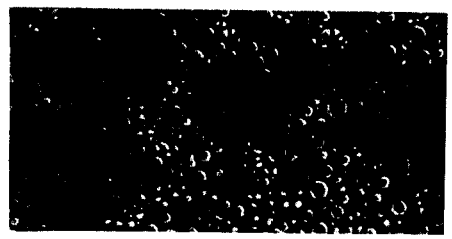

A: 10% TSB - Direct Light
200x

B: 5% NaCl - Crossed Polars
128x

B: 5% NaCl - Direct Light
200x

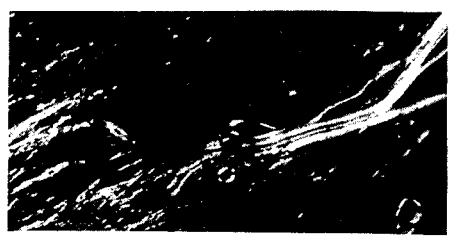

C: 2% NaCl - Crossed Polars
160x

OIL DISPLACEMENT ENHANCED BY LYOTROPIC LIQUID CRYSTALS IN HIGHLY SALINE MEDIA

This is a continuation of application Ser. No. 47,641, filed June 11, 1979, now abandoned.

BACKGROUND OF THE INVENTION

1. Field of the Invention

This invention relates to a method of recovering oil from an oil-bearing formation using a liquid containing a surfactant. More particularly, the liquid used to displace oil is a liquid crystal which is especially useful for recovering oil from high brine fields.

2. Description of the Prior Art

The use of microemulsions in secondary and tertiary oil recovery techniques is well-known. Liquid crystal compositions, however, have not been studied to any extent with respect to their potential for the chemically enhanced recovery of crude oil.

An early work which suggests the use of a surfactant system which may possess a liquid crystalline character for oil recovery is U.S. Pat. No. 3,391,736 (Abdo). This patent describes a positive nonsimple fluid useful for recovering oil which possesses a shear thickening response at low shear rates and shear thinning response at high shear rates based on a carboxylate surfactant system. Both of these properties were later claimed in Canadian Pat. No. 921,690 to Murphy who described a system exhibiting birefringence and containing 59–94% water, 3–20% oil, 2–16% surfactant and 1–5% alcohol.

U.S. Pat. No. 3,954,627 (Dreher and Gogarty) describes a composition useful for stimulating oil wells and containing lamellar micelles exhibiting retro-viscous property. These compositions contain from 4–15% surfactant, 30–70% hydrocarbon and 15–66% water, and optionally a co-surfactant and up to 5 wt.% of an electrolyte. They are birefringent and are probably liquid crystalline in nature. Related patents are U.S. Pat. Nos. 3,948,782 and 3,928,215.

More recently, Dreher et al (J. Coll. and Interf. Sci. 57, 379–387 (1976)) studied a system composed of alkylbenzene sulfonate, hydrocarbon, water and co-surfactant as a model for a tertiary oil recovery fluid. The rheological properties indicated that this system could exist as either a microemulsion or liquid crystal depending on the particular composition. Further studies on certain alkylaryl and petroleum sulfonates indicate that liquid crystalline phases can be formed and the formation of these phases are of interest for chemically enhanced oil recovery since they can effect, for example, interfacial tension, viscosity, and retention. For reference, see articles in the Preprints, Div. Petr. Chem., A.C.S., 23(2), 644 (1978) by Scriven et al and ibid., 23(2), 682 (1978) by Miller et al.

Finally, Shah et al in the J. Amer. Oil Chem. Soc., 55, 367 (1978) disclosed a surfactant system based on a mixture of petroleum sulfonate and ethoxylated alkane sulfonate in brine which was tolerant to salts including large amounts of $CaCl_2$ and $MgCl_2$. At certain salt concentrations, it was reported that a stable birefringent phase formed.

In spite of the hypotheses of the above articles, it is generally believed in the art that liquid crystals are not a practical fluid for oil displacement. The reason for this is the high viscosity associated with liquid crystals. For example, Reed and Healy in an article entitled, "Some Physiochemical Aspects of Microemulsion Flooding: A Review," which appeared in the monograph Improved Oil Recovery by Surfactant and Polymer Flooding, Shah and Schechter, Academic Press, N.Y., 1977, emphasized in part D, especially Page 402, that the excessive viscosity associated with lamellar structures would prohibit application of these compositions to tertiary oil recovery. This pessimism is reflected in the absence of published experiments wherein liquid crystals were used to displace oil. In addition to viscosity considerations, high brine concentrations provide an additional negative factor since it is generally believed that high salt concentrations destabilize liquid crystals.

It would be highly desirable to show that lyotropic liquid crystals containing minor amounts of surfactants and oil are stable in the presence of highly concentrated brine and provide an alternative and improved means to displace oil as compared to microemulsions.

SUMMARY OF THE INVENTION

It has been discovered that lyotropic liquid crystals containing minor amounts of surfactants are stable in the presence of highly concentrated brine and that the liquid crystals can be used to effectively displace oil. Accordingly, the present invention relates to a process for recovering oil from an oil-bearing formation by displacing oil with a primary displacement fluid containing liquid crystals. More particularly, the process comprises injecting into the formation a liquid containing an effective amount of a surfactant to displace oil, said liquid comprising a liquid crystal containing from 0.05 to 10 vol.% of surfactant, 0.1 to 20 vol.% of oil and brine containing up to 30 wt.%, based on water, of inorganic salts, driving the liquid through the formation and recovering the displaced oil.

In spite of the high viscosity and known tendency to destabilize at high brine concentrations, it has been found that liquid crystals can be used for oil displacement at least as effectively as microemulsions of comparable composition. The formation of liquid crystals in high brine generally requires somewhat higher molecular weight surfactants at slightly higher concentrations than the formation of microemulsions. On the other hand, liquid crystals possess higher integrity, i.e., less miscibility, and lead to an earlier banking of oil and greater recovery over comparable microemulsions at high brine.

BRIEF DESCRIPTION OF THE DRAWINGS

FIG. 5 is a copy of photomicrographs of liquid crystalline phases.

DETAILED DESCRIPTION OF THE INVENTION

Figure 1:
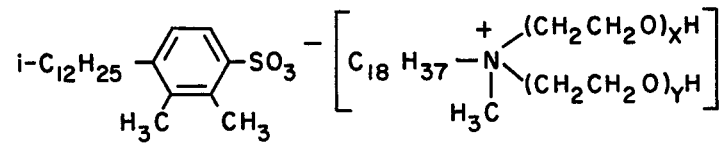
FIG. 1 is a graph showing the comparison of oil recovery by liquid crystal versus microemulsion.
Figure 1:
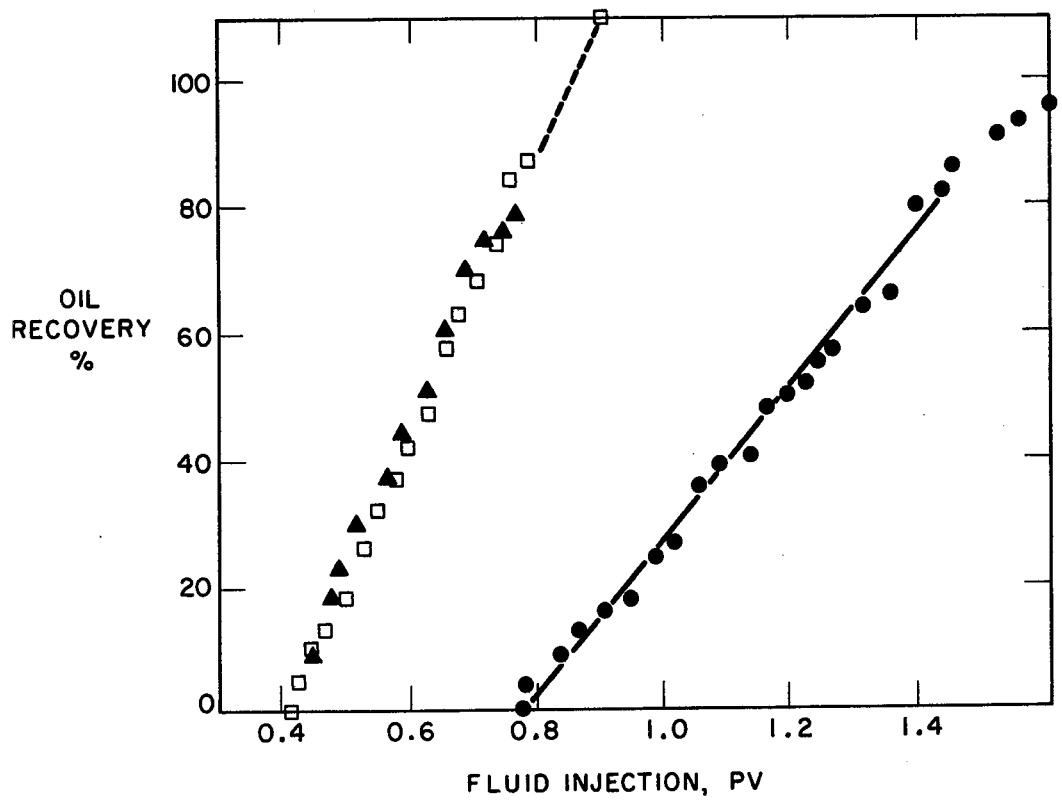

Liquid crystals can be recognized by their anisotropic character. For example, they exhibit birefringence with polarizing microscopy. The present liquid crystals are more highly ordered than known micellar fluids and preferably have a lamellar structure as indicated by microscopy and proven by X-ray diffraction studies.

The essential components of liquid crystals are minor amounts of surfactants and major amounts of brine. These compositions preferably contain minor amounts of oil and may also contain optional additives such as co-solvents, co-surfactants, hydrotropes, chelating agents and polymers.

The present compositions contain from 0.05 to 10, preferably 0.1 to 7 and especially 0.2 to 3.8 vol.% of surfactant; from 0 to 25, preferably 0.1 to 20 and particularly 0.5 to 10 vol.% of oil and the balance water containing up to 30 wt.%, based on water, of inorganic salts. The total inorganic salt concentration is from 1 to 30, preferably 3 to 30 and especially 5 to 30 wt.%. Preferred brines have sodium chloride as the major component together with minor amounts of salts of divalent metals such as $Ca^{2+}$ and $Mg^{2+}$.

The oil component of the liquid crystal may be a crude oil or a distillate hydrocarbon oil product such as a pentane-hexane mixture, diesel fuel, gas oil, lubricating oil or alkyl benzenes. The non-sulfonated residual hydrocarbon oil of sulfonic acid components is preferably incorporated into the present compositions. In the case of technical petroleum sulfonates, this oil is often a major component of the surfactant. Such surfactants may be employed for liquid crystal preparation without added hydrocarbons.

Different hydrocarbons have a varying ability to stabilize liquid crystals. Crude oil often is less preferred than detergent range paraffins, e.g., those in diesel fuel (such as n-decane) or gas oil from the viewpoint of liquid crystal stability. If crude oil is used, it should preferably have a similar composition to that of the oil field where oil recovery is to be enhanced. It may also contain added salts such as sodium silicates, sodium phosphates and phosphites.

The surfactants which are the active ingredients in the liquid crystals can be anionic, cationic, nonionic, amphoteric, combined anionic and cationic or mixtures thereof. Ethoxylated and/or propoxylated surfactants either alone or in combination with other surfactants are preferred.

Anionic surfactants are carboxylates, sulfonates, sulfates, phenolates and esters of phosphorus acids. Preferred anionic surfactants are sulfonates, sulfates, phosphates, phosphonates and phosphinates.

Surfactant carboxylates include $C_{12}$ to $C_{40}$ aliphatic carboxylates and $C_{16}$ to $C_{40}$ alkylaryl carboxylates wherein the alkyl chain has at least 12 carbon atoms. The aliphatic carboxylates can be open chain and isocyclic. Examples of open chain carboxylic acids are tall oil, palmitic, oleic, hydroxystearic, linoleic, linolenic, undecylenic, lauric perfluorodecanoic acids. Among the isocyclic compounds, naphthenic acids, rosin acids such as abietic acid and cholic acids are exemplary. Aromatic carboxylic acids include dodecylbenzoic acid, octadecylsalicylic acid, hexadecyloxybenzoic acid. Substituted carboxylic acids are exemplified by the N-acylsarosinates derived from fatty acids and N-methyl glycine sodium salt:

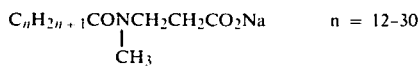
$\qquad n = 12-30$

Among the anionic sulfonates, $C_{18}$ to $C_{56}$ alkylaryl sulfonic acid salts are important. Higher alkyl derivatives of benzene, toluene and xylene sulfonic acids are preferred where the alkyl moiety is at least $C_{12}$, preferably $C_{12}$ to $C_{50}$, more preferably $C_{14}$ to $C_{36}$ and especially $C_{15}$ to $C_{30}$. Among other aromatic sulfonates, alkyl derivatives of naphthalene sulfonic acid, tetrahydronaphthalene sulfonic acid, and diphenyl ether sulfonic acid are preferred. The alkyl substituents of aromatic sulfonic acids can be substituted by substituted alkyl group such as alkyloxy and alkylthio. The aromatic group can be also polyethoxylated. Disulfonated aromatics and petroleum sulfonates are other classes of interest.

Sulfonate surfactants can also be aliphatic such as alkane sulfonates, which can be $\beta$-alkoxylated, hydroxyalkane sulfonates and alkene sulfonates. These sulfonates are $C_{12}$ to $C_{60}$, preferably $C_{16}$ to $C_{40}$, in the aliphatic hydrocarbon groups. Substituted aliphatic sulfonates include sulfonate derivatives of ethoxylated alkyl phenols derived from the corresponding ethoxylated sulfates. Another group of substituted sulfonates are represented by dialkyl sulfosuccinates derived from dialkyl maleates via the addition of sodium hydrogen sulfite. Further distinct classes of substituted sulfonates are those of N-acyl N-alkyl taurates preferably derived from N-methyl or N-cyclohexyl taurate and a fatty acid chloride, and sulfoethyl esters of fatty acids derived from sodium isothinate and a fatty acid chloride,

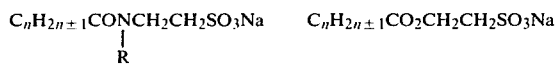

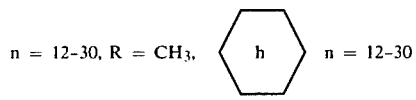

including analogous higher alkylated sulfoethyl esters

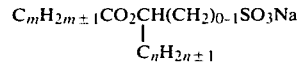

$m = 1-30, n = 12-30$

Surfactant sulfates include $C_{12}$ to $C_{40}$ aliphatic sulfates. Alkyl sulfates such as lauryl and tallow sulfate represent the most common subgroup of this class derived from the corresponding alcohols. Unsaturated carboxylic acids and their esters, such as fats and oils, can be also sulfated via sulfuric acid addition to their olefinic groups and as such, provide another type of sulfated surfactants.

Hydroxyethyl amides of $C_{12}$ to $C_{40}$ fatty acids can be also sulfated to yield members of the sulfated alkanolamide class. More importantly, ethoxylated higher alcohols and alkylphenols are sulfated to yield very important classes of ethoxylated sulfates. These ethoxylated intermediates can be propoxylated before sulfation. The starting alcohols of anionic sulfate surfactants are preferably in the $C_{12}$ to $C_{36}$ range. The alkyl groups of the alkyl-phenols-cresols and xylenols range from $C_{12}$ to $C_{60}$, e.g.,

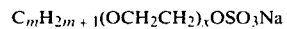

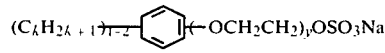

-continued
$m = C_{12}-C_{40}, x, y = 0-30, k = 12-60.$

Partial $C_{12}-C_{40}$ esters of the various phosphorus acids particularly of orthophosphoric, polyphosphoric and phosphoric acids represent another broad class of anionic surfactants. Exemplary products of simple alcohols are diethylhexyl phosphate and polyphosphate. The phosphates are preferably employed as a mixture of mono- and diesters, e.g., $C_mH_{2m+1}(OCH_2CH_2)_xOPO_3Na_2\{[C_mH_{2m+1}(OCH_2CH_2)_x]O\}_2PO_2Na$ $x = 0-30; m = 12-40$ Such phosphate derivatives of dodecyl and octadecyl alcohols and their ethoxylated and propoxylated derivatives are other exemplary anionics of this type. Phosphate derivatives of ethoxylated alkyl phenols such as dodecylphenol and dinonylphenol are also included, e.g.,

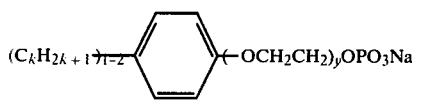

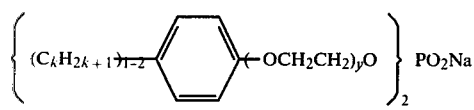

$y = 0-30$

Higher alkyl phenolates, such as octadecyl phenolate and dodecyl naphtholate are also regarded as anionic components.

Certain amphoteric compounds having a combination of weakly basic and strongly acidic groups can also be used as anionic surfactant components. Exemplary types of such compounds are:

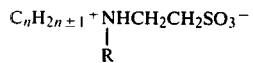

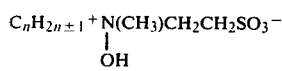

$n = 12-30$

Comicellization forming combined surfactants also occurs with amphoteric compounds in general, e.g., $C_nH_{2n\pm1}{}^+N(CH_3)_2CH_2CH_2CH_2SO_3{}^-; \quad n = 12-30$ Suitable cationic components are surfactant bases and their salts. In the present discussion, surfactant bases will be usually considered, although it is understood that they can be employed in the salt form. Quaternary salts, however, will be discussed as such since they are usually unstable and not available as free bases. Among the cationic surfactants, ammonium salts, phosphonium salts and quaternary ammonium salt are preferred.

The most important class of cationic surfactants are higher aliphatic amines. The carbon range of the aliphatic groups is 12 to 40, preferably 13 to 30. The amines can be primary, secondary and tertiary. The tertiary amines, of course, may contain 1 to 3 higher alkyl groups. In the case of the higher monoalkyl amines, the $C_{16}$ to $C_{30}$ alkyl range is most preferred.

A preferred class of aliphatic amines has open chain substituents such as straight chain saturated alkyl radicals. Examples are lauryl and stearyl amine. They can also be branched alkyl groups, preferably α,α-dimethyl alkyl groups such as those in Primenes and α and β-substituted alkyl groups wherein the α- and β-substitute is a $C_4$ to $C_{12}$ straight chain alkyl group. Typical straight chain unsaturated amines are the fatty amines, e.g., tallow, oleyl and soya amines. Aliphatic amines can also have isocyclic structures such as the rosin amines, e.g., dehydroabietyl amine and they can be benzylic such as octadecylbenzylamine.

A particularly preferred cationic amine is derived via the ethoxylation (and/or propoxylation) of cationic primary and secondary amines such as octadecyl amine, rosin amine, α,α-dimethyl octadecyl amine, dilauryl amine, alkyl pyridine, alkyl morpholine with from 2 to 30 moles of ethylene oxide. Except for the α,α-disubstituted compounds, primary amines are ethoxylated involving both amine hydrogen atoms to provide the types of cationic surfactants exemplified by the following:

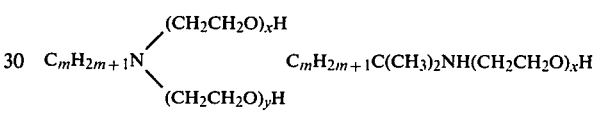

$m = 12-30, x + y = 3-30$

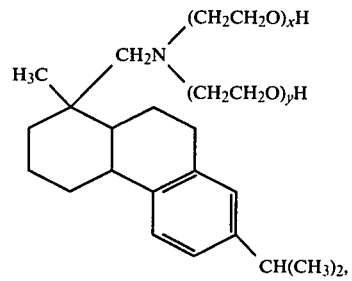

$x + y = 2-30$

Another preferred group of cationic amines is represented by $C_{12}$ to $C_{40}$ diamines and triamines derived from primary amines via cyanoethylation and reductive amination sequences. These types of compounds are derived from fatty amines. Examples of the diamines derived from fatty amines are sold under the Tradename Duomeens manufactured by Armak Co. They also can be used in the form of their ethoxylated derivatives, e.g.,

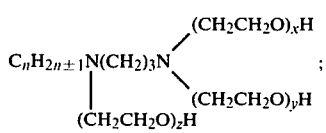

$x + y + z = 3-30$
$n = 12-30$

Among the fatty diamines and triamines are cyclic compounds, particularly imidazolines, derived by the reaction of fatty acid salts with hydroxy-ethyl ethylene diamine and diethylene triamine, respectively, e.g.,

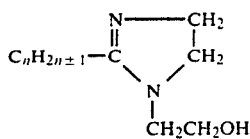

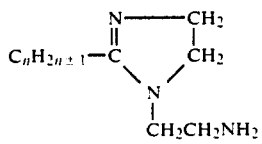

n = 12–30

These cationic imidazolines can be also advantageously ethoxylated. Amines can also possess polypropylene oxide blocks as oleophilic units. A preferred cationic component of this type is available under the Tradename of Poloxamine manufactured by BASF Wyandotte:

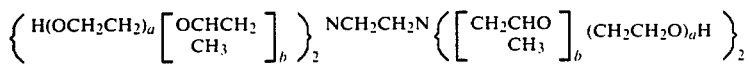

where the molecular weight ranges from 300 to 2000 and the weight ratio of ethylene oxide units in the oligomer ranges from 10 to 80%.

Surfactant amides, especially ethoxylated fatty amides may also serve as weakly basic cationic components, e.g.,

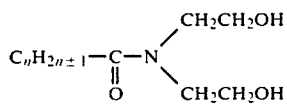

n = 12–30; x = 1 to 25

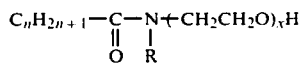

R = H, CH$_3$

The second most important class of cationic surfactants are higher aliphatic derivatives of quaternary ammonium salts. The quaternary salts are usually derived from the corresponding cationic amines cited above. The agents for quaternarization include methyl chloride, dimethyl sulfate, diethyl sulfonate, alkyl tosylates, ethylene chlorohydrin and benzyl chloride, particularly methyl chloride.

The preferred quaternary compounds are fatty amine, fatty diamine, rosine amine derivatives, especially the quaternaries based on ethoxylated derivatives of these amines. Ethoxylated alkyl pyridinium halides are another preferred type of cationic components.

Quaternary phosphonium salts having 1 to 4 C$_{12}$ to C$_{40}$ aliphatic groups represent another important class of cationic surfactants. These phosphonium salts include compounds having structures analogous to the discussed ammonium salts. The preferred quaternary phosphonium compounds also include phenyl substituted derivatives. As a reference on the tetraalkyl phosphonium cation species, U.S. Pat. Nos. 3,929,849 and 3,998,754 (A. A. Oswald) are incorporated by reference. In a manner similar to the quaternary ammonium components, a particularly preferred class of phosphonium components possesses oxyethyl or oxypropyl units (x=1–30).

Less common cationic surfactants include weakly basic surfactant and surfactant precursors such as amine oxides, phosphine oxides and sulfoxides and their ethoxylated and propoxylated derivatives, examples of which are:

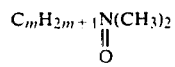

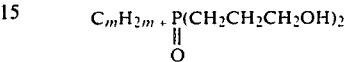

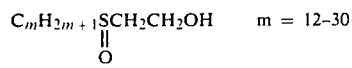   m = 12–30

Amphoteric compounds having a combination of acidic and basic groups can be also used. Exemplary types of such compounds are the following:

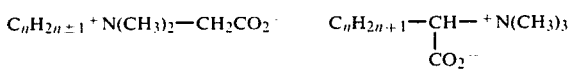

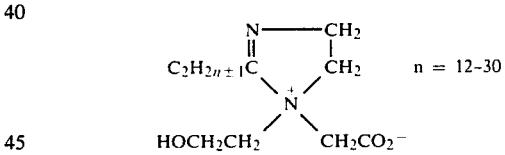

n = 12–30

Nonionic surfactants are ethoxylated derivatives of phenols, amines, carboxylic acids, alcohols, mercaptans and polyhydroxy compounds. Ethoxylated C$_{12}$ to C$_{40}$ alcohols and alkylphenols are preferred. The ethoxylated phenols have the formula:

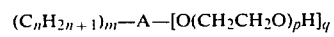

where n is from 1 to 30; A is benzene, naphthalene or diphenyl; p is 2 to 30; q is 1 or 2 and m is from 1 to 5 with the proviso that there is at least one C$_{12}$ to C$_{30}$ alkyl chain.

Combined anionic-cationic surfactants of balanced hydrophilic-lipophilic character may be composed of the surfactant ions of the above-defined anionic, cationic and amphoteric surfactants. Their balance is preferably assured by an appropriate degree of ethoxylation. A preferred surfactant system relates to anionic, and cationic surfactants which may be combined to produce balanced biamphiphilic anionic-cationic salt compositions. Ethoxylated alkyl ammonium sulfonates of the formula

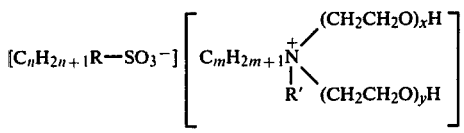

where R is phenyl, tolyl or xylyl; R' = H or CH$_3$; n is 12 to 40; m is 12 to 36 and x+y is from 2 to 30 are preferred.

The present liquid crystals are stabilized by higher alkyl lipophilic moieties of the surfactants. In the case of olefin, alcohol and alkyl benzene derivatives, these lipophilic moieties are at least C$_{12}$ on the average. The optimum alkyl chain length, however, is generally higher for the surfactant constituents of liquid crystals as compared to microemulsions.

If one considers the higher alkyl moiety of surfactants generally, lower ranges favor the formation of microemulsions only, higher ranges liquid crystals only, and both liquid crystals and microemulsions can be formulated from intermediate ranges. The precise values are, of course, dependent on the surfactant system in question. Balanced combined quaternary ammonium sulfonate surfactants of the formula:

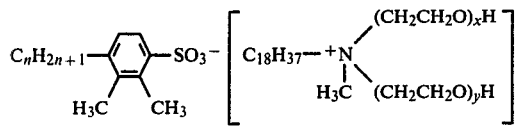

x + y = 5-10;

are an example wherein such a dependence was observed on the higher alkyl substituent of the xylene sulfonate moiety. The combined ammonium i-nonyl xylene sulfonate formed only balanced microemulsions when mixed with about one volume of n-decane per thirteen volumes Tar Springs Brine. The corresponding i-dodecyl derivative provided both microemulsions and liquid crystals. Finally, the i-octadecyl xylene sulfonate formed only liquid crystals. It is noted that if one relies on unaided visual observations as is commonly done in the prior art, an oil-water based liquid crystal can easily be mistaken for a "microemulsion."

The formation and stability of liquid crystals are dependent on structural parameters. Unlike most micellar systems, the present lyotropic liquid crystals are largely functions of the molecular packing of surfactants, and therefore, minor structural changes will strongly influence stability. For example, ortho-substituted alkyl benzene sulfonates, such as alkyl xylene sulfonates, are preferred. In the case of anionic sulfonates, it is also preferred to have branched rather than straight chain monoalkyl groups.

Other phenomena which influence liquid crystal formation and stability include hydrogen bonding and an appropriate hydrophilic-lipophilic balance (HLB) of the surfactant components. Systems in which hydrogen bonding is possible, e.g., ethoxylated ammonium segments terminated by a hydroxy group, possess a much higher tendency to form liquid crystals over systems in which hydrogen bonding is not possible. Furthermore, liquid crystal compositions are stabilized by the balanced character for the surfactants and the preferred means for achieving this is surfactant ethoxylation.

Ethoxylated surfactants are also preferred from the viewpoint of salt tolerance of the liquid crystal compositions. An increasing number of ethoxy groups in a surfactant molecule is known to increase both the hydrophilic character and the salt tolerance of the surfactant. According to the present invention, surfactant based lyotropic liquid crystals are increasingly stabilized in high brine containing media with the increased ethoxylation of the surfactant. The brine stability of liquid crystals, however, does not increase indefinitely with the increasing ethoxylation of the surfactant. An optimum of stability is reached then a sudden decrease is observed. In general, the optimum range of average ethoxylation for any given composition is within 6, preferably within 3, most preferably within 2 ethoxy units. The average ethoxylation is below that of the corresponding microemulsions.

Most primary technical ethoxylated surfactant products have a Poisson distribution of the number of ethoxy units due to the epoxide ring opening involved in their synthesis. These primary products of varying average ethoxylation are often mixed to produce a desired average ethoxylation for certain applications. Of course, such mixing of two ethoxylated surfactants results in a wider molecular weight distribution of bimodal character. In some use areas, mixtures of surfactants of widely different ethoxylation are desirable. However, for the synthesis of the present liquid crystals of increased stability, a narrow molecular weight distribution is desired. If two components of different ethoxylation are mixed, it is preferred that their degrees of ethoxylation should differ by less than 10, more preferably less than 5, most preferably less than 2. As a rule, mixing of different ethoxylation surfactants is recommended only for an exact control of average ethoxylation where desired. Whenever economical, surfactant components having a single ethoxylation value are preferred. Beyond liquid crystal stability, this is also advantageous for reducing selective adsorption since adsorption is also reduced by increased ethoxylation.

Largely for economic reasons, the application of surfactant mixtures is sometimes desired. For example, as far as anionic surfactants are concerned, the mixing of inexpensive petroleum sulfonate salts with ethoxylated surfactants can be advantageous. It is surprisingly found that such mixtures with petroleum sulfonates, e.g., ethoxylated sulfonates, sulfates and phosphates, are stabilized when present in the liquid crystals of this invention.

A preferred class of liquid crystals has surfactants containing moieties having direct and indirect temperature-solubility relationships in a balanced proportion. For example, such surfactants have appropriate segments of alkyl groups whose solubility increases with temperature and polyethylene oxide segments which become less soluble with increasing temperatures. The solubility of surfactants optimized in this manner does not change significantly in a broad temperature range. This characteristic stabilizes the temperature stability of the present lyotropic liquid crystals and consequently extends their application to varying oil fields of increasing temperature.

With respect to the chemically enhanced displacement of oil, the techniques for secondary or tertiary recovery conventionally employed with microemulsions are applicable to liquid crystals. A typical procedure includes the injection of a liquid crystal slug followed by a pusher slug and a slug of unthickened water.

The pusher slug is usually a thickened brine so as to eliminate fingering effects. Any of the conventional thickening agents may be used to provide viscosity control. Examples include polysaccharides and biopolymers such as xanthan polymers, partially hydrolyzed polyacrylamides, fatty acid soaps, alginates, amines, glycerine and the like.

The amount of liquid crystal injected is that effective to displace oil from the oil-bearing formation. Generally, from 0.01 to 1.0 pore volume based on the pore volume of the formation is sufficient.

The brine used in the liquid crystal and/or pusher is preferably similar to that found in the formation.

The liquid crystals may contain as optional additives, co-surfactants and/or co-solvents. Preferred co-surfactants and co-solvents include alcohols, ethoxylated-, sulfated ethoxylated- and sulfonated ethoxylated alcohols, all of which are $C_3$ to $C_{20}$ in the aliphatic chain as well as ethoxylated-, sulfated ethoxylated- and sulfonated ethoxylated alkyl phenols.

The additional components can also include alcohol solubilizers and cosurfactants, such as i-butanol, i-hexanols; sulfonate hydrotropes such as xylene sulfonate salts, polyacid salt chelating agents such as the sodium salt of tris-carboxymethyl phosphine, polymers such as branched polyethylene oxide, polysaccharide biopolymers, polymeric sulfonates. Unexpectedly, unlike most known microemulsions, the present liquid crystals do not require cosurfactants.

The present liquid crystals can be employed as a homogeneous fluid or in an admixture with either isotropic brine or microemulsion. Such mixtures are generally emulsion stabilized by the liquid crystal component. They are often formed directly from the liquid crystal components in one step. Both homogeneous liquid crystals and liquid crystal-brine mixtures can be employed for oil recovery.

The liquid crystalline displacement fluids of the present invention can be employed via conventional oil recovery techniques, particularly those developed for employing microemulsions.

For further details on oil recovery techniques using microemulsions, reference is made to R. W. Healy and R. L. Reed, Society of Petroleum Engineers, 17, 129 (1977) and the papers cited therein.

In spite of the relatively high viscosity exhibited by liquid crystals, it has been discovered that their use in oil recovery results in a more complete recovery at a faster rate as compared to similar microemulsions. This is in contrast to the general view of the art that high viscosity is a disadvantage in terms chemically enhanced oil recovery. In fact, typical prior art microemulsions have very low viscosities and require thickeners so as to avoid fingering effects. In addition, liquid crystals are usually found to be more stable to dilution by brine than microemulsions.

The method of the invention is further illustrated by the following examples.

EXAMPLES

General Test Procedures.

Oil recoveries are determined by conventional sand pack tests. The sand used is a crushed Berea sandstone of 40 to 100 mesh size. Oil displacement measurements are determined from a glass burette having a 15 mm diameter, a total volume of 100 ml and calibrated at 0.1 ml intervals.

Filter paper is positioned in the bottom of the burette and the burette rotated while 75 g of sand is slowly added over a period of about 15 minutes. Thereafter, a filter paper and a magnetic stirrer are placed on top of the sand. The total weight of sand is checked and its volume ($\sim 46$ ml) determined.

Air is purged from the burette by carbon dioxide for 30 minutes. The column is then flooded from the bottom with 40 ml brine at a rate of about 20 ml per hour. The brine used in the examples is Tar Springs Brine (TSB), characteristic of the Loudon oil field. TSB contains about 10 wt./vol. % of mixed salts with a 9 to 1 mono- to divalent metal salt ratio. The composition of the salts in grams/liter is as follows: NaCl—92.07; $CaCl_2$—7.89; $MgCl_2$—4.93; $BaCl_2.2H_2O$—0.113; $NaNCO_3$—0.195.

The brine is injected into the column with a Sage Syringe Pump, Model 355, having 50 ml syringes. The 20 ml per hour delivery is provided at the 1/100×50% setting from the syringe through a ⅛ inch Teflon tubing fitted to the bottom of the column. After the brine flooding, the supernatant aqueous phase is removed and the column weighed to determine the pore volume by difference. The pore volume is usually about 18 ml.

Thereafter, the column is again flooded, this time with 35 ml oil (Loudon crude) at the same rate. The volume of the top oil layer is measured to determine the volume of the resident oil by difference. The resident oil is usually about 10 ml.

The final step of preparing the sand pack for testing is flooding with 40 ml brine again at the same rate. The volume of oil removed is then determined and the residual oil saturation calculated. Its value is usually about 4 ml. The excess liquids are then syphoned off from above the sand and the sand pack column is ready for oil recovery testing.

The prepared test column is flooded from the bottom with 40 ml of the displacement medium at a rate of 2 ml per hour. This rate is provided by a 1/1000×40% setting. The total volume out, volume of oil produced and the position of the advancing oil front are observed. The time of breakthrough for the aqueous media and the appearance of liquid crystals below the oil are also noted. The main results of the experiments are shown in the examples by appropriate figures wherein the fraction of pore volume liquid produced versus the percentage oil recovery are plotted.

EXAMPLE 1

This example illustrates the improved oil recovery by a liquid crystal composition versus a microemulsion, wherein the active component of both, i.e., the surfactant, is a combined anionic-cationic surfactant. The combined surfactants are quaternary ammonium sulfonates having slightly varying degrees of ethoxylation and are described in the following formula:

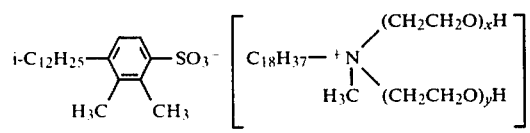

$x + y = 7, 7.5$

The combined surfactants are prepared by mixing stoichiometric amounts of the sodium salt of the sulfonic acid with the ethoxylated quaternary ammonium chloride.

Two liquid crystals (lc) and one microemulsion (me) based on the above-described surfactant systems are prepared. The first lc composition contains 12 wt. parts combined surfactant (x+y=7.5 prepared by combining x+y=5 and x+y=10 products) in a 50/50 mixture of Tar Springs Brine (TSB) and Distilled Loudon Crude Oil (Oil). This composition was prepared by adding 4% of the combined surfactant to the mixture of TSB and Oil. The resulting emulsion was then centrifuged at 25,000 G for four hours. As a result, the lc composition separated as a birefringent middle phase. This lc composition had a lamellar structure according to X-ray diffraction studies. The repeat layer distance was 68 Å. Its apparent Brookfield viscosity is 80 cP at a shear rate of 1.6 sec$^{-1}$. It is shear thinning, i.e., non-Newtonian in character, as lamellar liquid crystals generally are.

The second lc composition was produced by adding 3 wt. parts of a similar surfactant having a slightly lower degree of ethoxylation (x+y=7) to 100 parts of a TSB, n-decane mixture having a 93 to 7 volume ratio. This lc had a lower Brookfield viscosity (30 cP at 1.6 sec$^{-1}$) but was also non-Newtonian in character at low shear rates.

The third composition was a microemulsion produced by 2 parts per 100 of the surfactant of the first lc when using a 93 to 7 TSB to n-decane ratio. This me had a very low apparent viscosity, 3.6 cP at 7.3 sec$^{-1}$.

The oil recovery results obtained using the three compositions are summarized in FIG. 1 by plotting fraction of pore volume fluid injected as a function of residual oil recovered. In FIG. 1, the symbols ▲, ☐ and ⊙ represent the first and second liquid crystals and the microemulsion, respectively. In essence, these results demonstrate that the two liquid crystals displaced oil at a similar and much faster rate than the microemulsion.

The use of the first lc resulted in a rapid oil bank formation and front advancement. Oil production started early at 0.43 pore volume (PV) and continued at a rapid, steady rate until 79% of the oil was recovered at 0.77 PV. Thereafter, 11 ml of a separate brownish liquid crystal layer was produced. In volume, this is double of that of the residual oil. This layer apparently contained significant quantities of Loudon Crude (LC) Oil in addition to the distilled Loudon Crude (DLC) Oil. The brine phase remained clear and transparent during this secondary oil production. The brine turbulence, usually characteristic of microemulsions breakthrough, occurred only thereafter at 1.34 PV. Indications were for complete LC oil plus DLC oil recovery.

In the case of the second lc, oil production also started early (0.41 PV) and occurred at a fast, steady rate. LC oil pick-up by this liquid crystal was less. About 87% of the LC oil was produced as the first separate layer at 0.79 PV. Thereafter, again a liquid crystal layer was produced.

The comparative experiment with the me composition also resulted in a complete oil recovery but at a much slower rate. Oil production started at 0.76 PV. Breakthrough occurred when 86% of the oil was recovered at 1.46 PV. The total apparent oil production was 104%.

EXAMPLE 2

The effect on oil recovery by liquid crystals based on the different structure of the combined surfactants is described in this example. The surfactants are set forth as follows:

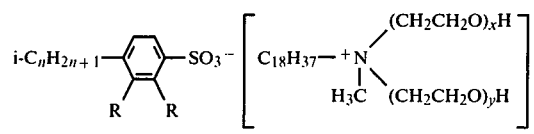

I: ● $n = 12$ $R = H$ $x + y = 6(5 + 7)$
II: ▲ $n = 18$ $R = CH_3$ $x + y = 9.3(9 + 10)$

The compositions of the liquid crystals are summarized in the following table.

TABLE I

| No. | Symbol | Composition | | | Viscosity cP (7.3 sec$^{-1}$) |
|---|---|---|---|---|---|
| | | TSB | Oil | Surf | |
| I | ▲ | 92 | 8 | 2.4 | 18 |
| II | ● | 93 | 7 | 3 | 11 |

The surfactant is expressed in wt. parts per 100 parts of TSB/oil mixture in which the oil is n-decane. The amounts of TSB and oil are parts by volume. It is noted that the average degrees of ethoxylation for the two surfactants were selected to control their hydrophilic-lipophilic balance so as to provide liquid crystals of high brine to hydrocarbon ratio. The surfactant concentrations were close to the minimum needed to produce liquid crystals. Both liquid crystals had a non-Newtonian shear thinning character and comparable apparent viscosities.

Figure 2:
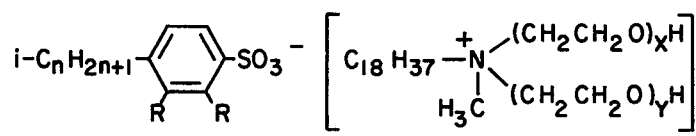
FIG. 2 is a graph illustrating the effect on oil recovery by liquid crystals based on different combined surfactants.
Figure 2:
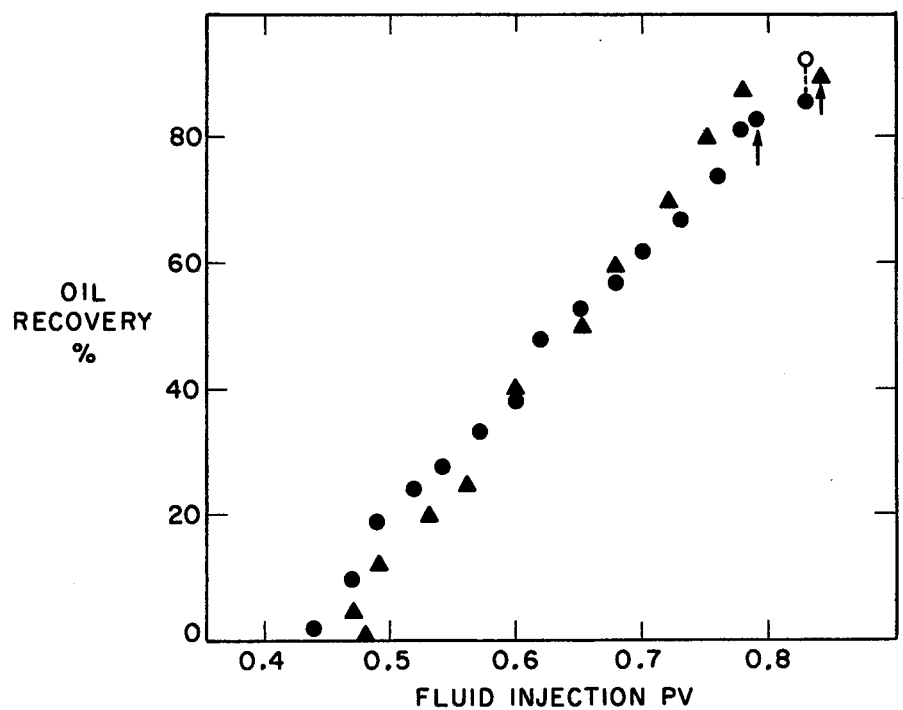

The oil recovery results obtained from the two different liquid crystals as a function of pore volume injected vs. oil recovered are shown in FIG. 2 in which the oil recovery from lc (I) is designated by ● and lc (II) by ▲. These results indicate that both liquid crystals produced oil early and at a fast rate, and are very similar to the results obtained from the liquid crystals of FIG. 1.

In the case of the i-dodecyl benzene sulfonate based combined surfactant (I), breakthrough occurred after 83% of the oil was recovered at 0.79 PV. At higher pore volumes, most of the oil was produced in a mixture with the displacement fluid as a liquid crystal. By the time 1.17 PV fluid was injected, 8.6 ml diluted liquid crystal layer accumulated below the recovered oil (3.6 ml, 86%). On centrifugation, 0.3 ml (7%) additional oil separated from this liquid crystal composition. Including this, the amount of the total oil recovery was 93%.

When using the i-octadecyl-o-xylene sulfonate based combined surfactant (II), breakthrough occurred after recovering 90% of the oil at 0.84 PV. The overall oil recovery behavior of this liquid crystal was similar to that of the previous composition. At high brine concentrations, this combined surfactant, unlike those described previously, has a tendency to form lc rather than me compositions.

EXAMPLE 3

This example is directed to the effect of different hydrocarbons on liquid crystal compositions containing the same combined surfactant and brine. The hydrocarbons are n-decane (D) and distilled Loudon Crude Oil (DLC). The combined surfactant is described by the following formula and Table:

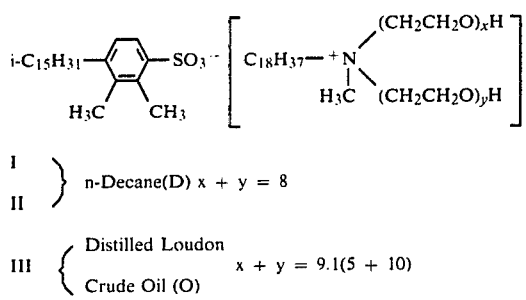

I, II  } n-Decane(D) x + y = 8

III { Distilled Loudon Crude Oil (O)  x + y = 9.1(5 + 10)

TABLE II

| No. | Symbol | Composition hydrocarbon Type | TSB | Surf | Viscosity, cP (sec$^{-1}$) (1.6) | (8) |
|---|---|---|---|---|---|---|
| I | ● | D | 7 | 93 | 2 | — | 10 |
| II | ▲ | D | 9.5 | 90.5 | 3.8 | 100 | 48 |
| III | ■ | DLC | 10 | 90 | 3.8 | 114 | 56 |

The surfactant concentration is in parts by weight per 100 parts of hydrocarbon/TSB mixture expressed in parts by volume.

It is noted that to achieve the required hydrophilic-lipophilic balance, the use of a more highly ethoxylated combined surfactant was necessary in the oil than in the decane mixtures. It should be also observed with regard to the two decane systems that the system containing a higher concentration of the surfactant had a higher hydrocarbon content. The decane system of lower surfactant concentration was of lower viscosity as expected. However, both systems exhibited non-Newtonian rheology in the shear rate region studied (1.6-16 sec$^{-1}$).

Figure 3:
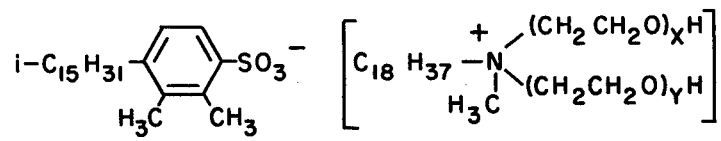
FIG. 3 is a graph demonstrating oil recovery by liquid crystals containing different hydrocarbons as oils.
Figure 3:
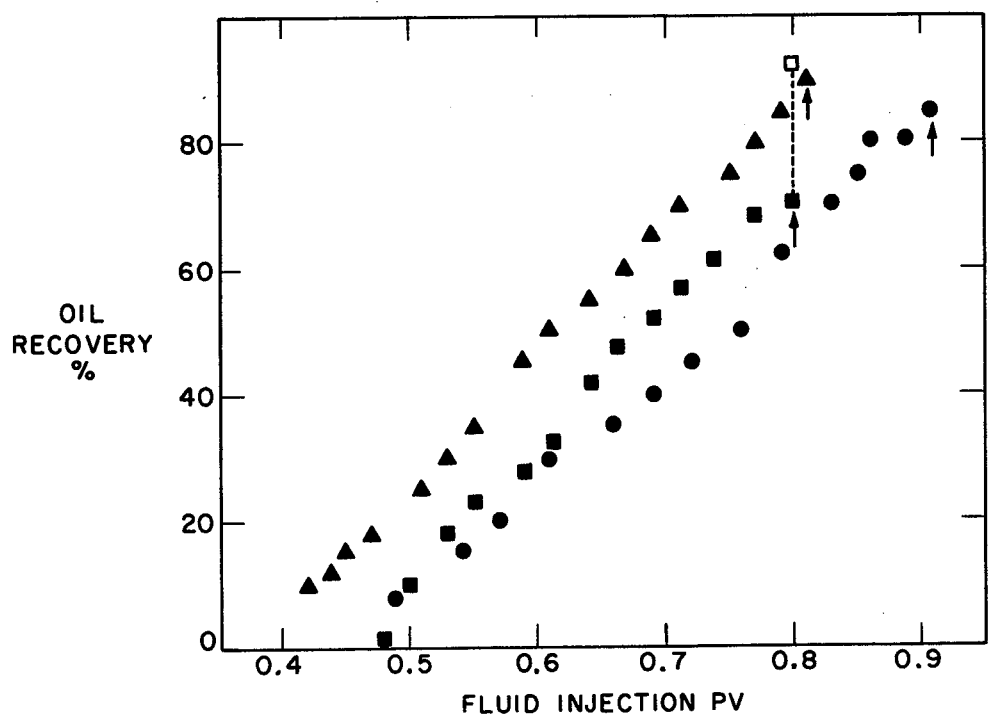

As is shown by FIG. 3, the oil recovery behavior of the three systems was very similar. The rate of oil production characterized by the overall slope of the injection-recovery correlation was practically identical for the two mixtures of higher surfactant concentration.

In the case of the two decane systems, the one with more surfactant started producing oil earlier. However, both systems produced oil almost at the same rate and continued to produce oil in the form of liquid crystal after breakthrough.

Interestingly, the distilled Loudon crude oil based system required more surfactant to produce liquid crystal organization. However, this oil system of relatively high surfactant content in more respects behaved like the decane system of low surfactant content. It took the longest time to produce oil and breakthrough occurred after a relatively small oil recovery. However, recovery in the form of liquid crystals continued. It was estimated on the basis of centrifugal separation that at 1.36 PV, the total oil recovery was 93%.

EXAMPLE 4

The comparison of liquid crystals versus microemulsions wherein the surfactant system is based on a mixture of anionic surfactants is demonstrated by this example. One liquid crystal and one microemulsion were prepared with the same mixture of two anionic sulfonate surfactants. The first surfactant was a petroleum sulfonate sodium salt of 465 average molecular weight, Petrostep 465, manufactured by Stepan Chemical Co. The second was the sodium sulfonate derivative of an ethoxylated n-alcohol, EOR 200 manufactured by Ethyl Corp. As such, the first surfactant was lipophilic; the second, hydrophilic in character. An appropriate mixture was used to provide the hydrophilic-lipophilic balance required.

The composition of the Petrostep 465 was 57.8% active sulfonate, 15.5% water, 2.7% inorganic salts mainly sodium sulfate and 24% non-sulfonated petroleum hydrocarbon. The latter provided the oil component of the liquid crystal. The technical ethoxylated sulfonate had an active content of 29.3% total solids of 49% and 2% "oil."

Interestingly, the lc and me compositions were prepared using the same concentration of the same surfactant mixture plus pentanol: 3% Petrostep 465 (1.7% active), 7% EOR-200 (2% active), 2% pentanol. When 5% aqueous sodium chloride was used to make up the rest (88%), the liquid crystal formed. When 2% aq. NaCl was employed instead, a microemulsion having a viscosity of 16 cP at 8 sec$^{-1}$ was produced. The Brookfield viscosities were 20 cP and 16 cP, respectively, at a shear rate of 8 sec$^{-1}$.

The liquid crystal had a non-Newtonian, i.e., shear thinning, viscosity character. However, its viscosity increased as shearing continued as indicated by the following results of repeated Brookfield viscosity determinations:

TABLE III

| Sequence of Viscosity Test | Apparent Viscosity, cP at Various (Stirring Rates, rpm) Shear Rates, Sec$^{-1}$ | | | |
|---|---|---|---|---|
| | (6) 1.6 | (12) 3.2 | (30) 8 | (60) 16 |
| 1 | 28 | 20 | 20 | 21 |
| 2 | 60 | 62 | 46 | 30 |
| 3 | 103 | 89 | 55 | 32 |

The microemulsion was less viscous and of a simple shear thinning behavior. At the 7.3 sec$^{-1}$ shear rate, this mixture had an apparent viscosity of 16 cP.

Figure 4:
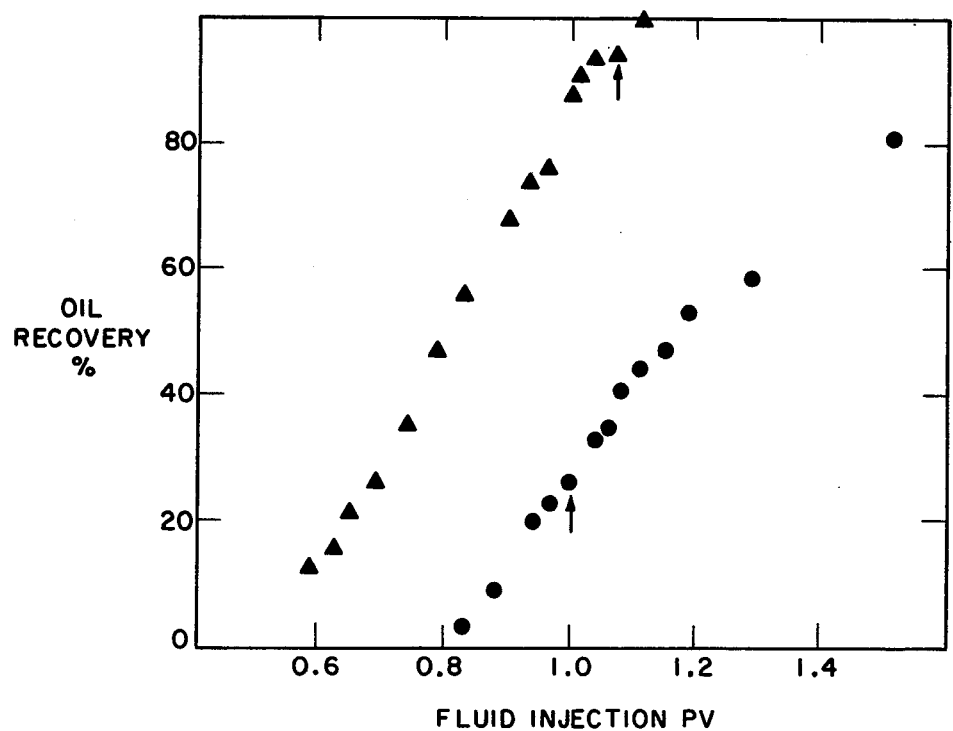
FIG. 4 is a graph of oil recovery by a liquid crystal versus a microemulsion prepared from the same surfactant system.

The oil recovery behavior for the liquid crystal (▲) and microemulsion (●) is shown in FIG. 4. This figure demonstrates the much superior behavior of the liquid crystal (lc) versus that of the microemulsion (me).

The use of the 5% NaCl aq. lc mixture, resulted in an early oil production at a fast rate. By the time of the breakthrough at 1.07 PV, 94% of the oil was recovered. At 1.11 PV, complete recovery was observed. Thereafter, the formation of a second liquid crystalline phase was observed between the recovered oil and displaced brine layer. The eventual oil production was more than 100%, apparently due to the oil introduced as a component of the liquid crystal composition.

In contrast, the application of the 2% NaCl mixture resulted in a comparatively delayed incomplete oil production. Oil production started at 0.73 PV. After recovering only about 26% of the oil, breakthrough has occurred at 1 PV. The total recovery was about 82% after 1.56 PV.

EXAMPLE 5

This example illustrates some properties of microemulsions versus liquid crystals based on combined ammonium sulfonate surfactants. Appropriate surfactants such as combined anionic-cationic surfactants of balanced hydrophilic-lipophilic character by definition will provide a middle phase containing equal volumes of oil and water (brine) and/or will reject equal amounts of oil and water (brine) when mixed in proper amounts with equal volumes of oil. Such middle phases can have a multiple phase character and a liquid crystalline, liquid crystalline plus isotropic microemulsion or isotropic microemulsion only character as exemplified by the following.

Approximately balanced middle phases were obtained using three combined quaternary ammonium sulfonate surfactants prepared from the corresponding methyl esters of sulfonic acids. The esters are described in U.S. Pat. No. 4,310,471 by A. A. Oswald and E. J. Mozeleski. The combined quaternary sulfonates were prepared by reacting the ester with the appropriate ethoxylated amines. The structures of the three surfactants used are shown in Table IV. The other components of the mixtures were 0.4 g (~4%) surfactant, 5 ml (~48%) distilled Loudon crude oil and 5 ml (~48%) of brine of varying salt concentration. Homogeneous mixtures were prepared by Vortex stirring for about 15 minutes. The mixtures were then centrifuged at 25° C. for a total of three hours at 27,000 G. To obtain stable three phase systems: Oil phase on the top, "microemulsion" middle phases and brine on the bottom. After the centrifugation, the phase volumes were determined and the middle phases were studied for visual appearance and birefringence. Middle phase samples were also investigated using polarizing and phase contrast microscopy. The observations are summarized in Table IV.

With regard to phase distribution and salt insensitivity, the results are described as follows. The volumes of the rejected oil and brine phases were generally comparable and surprisingly independent of the salt concentrations. Surprisingly, the investigation of the middle phases demonstrated that in the majority of cases, they contained anisotropic liquid crystals in isotropic fluid. It was particularly surprising that at high brine concentrations, liquid crystal formation appeared to be enhanced. The presence of oil apparently stabilized the liquid crystals.

The first combined surfactant, a pure one component compound (A), produced typical middle phase microemulsions at most brine concentrations. Significant liquid crystal middle phase formation occurred only when Tar Springs Brine (TSB) containing 10% of mixed salts including about 9.2% NaCl, 0.8% CaCl$_2$ and 0.5% CaCl$_2$ was used.

The second combined surfactant (B), a quaternary analog of a combined surfactant having an average degree of ethoxylation, produced birefringent liquid crystal middle phases at all salt concentrations. To the naked eye, most of these middle phases appeared to be typical translucent microemulsions. However, under the microscope, it became clear that they had larger droplet sizes.

The anisotropic liquid crystals separated from brine mixtures of different concentrations were microscopically different as illustrated by the pictures of FIG. 5. Most often liquid crystal droplets of various size (in the 16$\mu$ region) were observed as found in 10% TSB (Pictures A-1 and A-2). At 5% NaCl concentration, one of the liquid crystal phases appeared definitely lamellar in character (Pictures B-1 and B-2). Finally, at 2% salt concentration, typical flow birefringence was observed (Picture C).

The third combined surfactant (C) of Table IV based on an ethoxylated ether amine, produced liquid crystalline phases similar to the Ethomeen derivative (B). Again the translucent liquid crystals had the typical microemulsion appearance.

The behavior of eight centrifuged three phase systems based on the two hydroxy terminated ethoxylated amine derivatives (B and C) were studied at various temperatures to determine the stability of the liquid crystal phases. Observations at 35°, 50° and 70° C. showed that the anisotropic liquid crystal character of the middle phases was maintained, although the phase distributions changed somewhat.

Beyond the above microscopic studies, the structure of liquid crystals could be also diagnostically characterized by nuclear magnetic resonance (nmr). Nmr indicated special structural interactions increasing the relaxation times of nuclei. Investigations of the above middle phases and other liquid crystal mixtures showed that the viscosity of such liquid crystals is not necessarily too high and their interfacial tension is at a minimum. Therefore, liquid crystals possess oil displacement properties attractive for oil recovery.

TABLE IV

COMBINED AMMONIUM SULFONATE SURFACTANTS AS MICROEMULSIFIERS (IN 4% OIL, 48% DISTILLED LONDON CRUDE OIL AND 48% BRINE) OF VARYING SALT CONCENTRATION

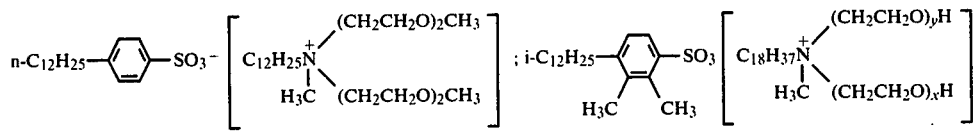

A. One Component Capped Derivative    B. Ethomeen Derivative; x + y = 7.5

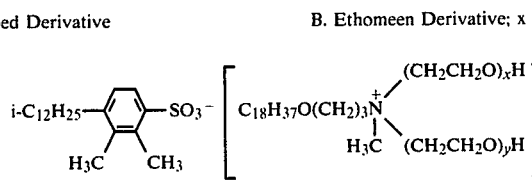

C. Ether Amine Derivative; x + y = 7.5

| | | | | Phase Distribution, % | | | Observations After 3 Hours Centrifugation at 25° C. and Appearance of Middle Phases (lc.: birefringent liquid crystal; me.: isotropic microemulsion) | | |
|---|---|---|---|---|---|---|---|---|---|
| | Surfactants | Salt Type | Conc. % | Oil | Middle Phases | Brine | Top | Middle | Bottom |
| No. | | | | | | | | | |
| 1 | A | TSB | 10 | 28 | 51 | 21 | 4% Emulsion | 48% Translucent me. | 48% Hazy lc. |

TABLE IV-continued
COMBINED AMMONIUM SULFONATE SURFACTANTS AS MICROEMULSIFIERS (IN 4% OIL, 48% DISTILLED LONDON CRUDE OIL AND 48% BRINE) OF VARYING SALT CONCENTRATION

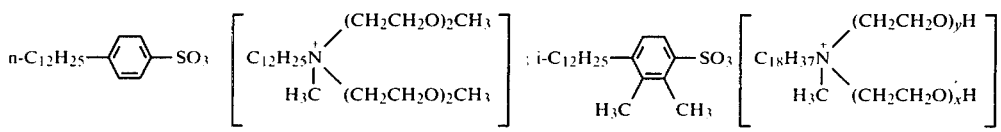

A. One Component Capped Derivative    B. Ethomeen Derivative; x + y = 7.5

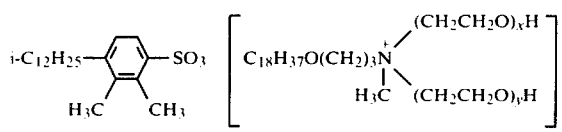

C. Ether Amine Derivative; x + y = 7.5

| | | | | | | Observations After 3 Hours Centrifugation at 25° C. and Appearance of Middle Phases | | |
|---|---|---|---|---|---|---|---|---|
| | | | Phase Distribution, % | | | | | |
| | Surfac- | Salt | | Middle | | (lc.: birefringent liquid crystal; me.: isotropic microemulsion) | | |
| No. | tants | Type | Conc. % | Oil | Phases | Brine | Top | Middle | Bottom |
| II | | | 5 | 17 | 56 | 27 | 16% Emulsion | 36% Hazy me. | 48% Clear me. |
| III | | NaCl | 5 | 19 | 52 | 29 | 13% Emulsion | 61% Hazy me. | 26% Clear me. |
| IV | | | 2 | 20 | 51 | 29 | 29% Emulsion | — | 71% Hazy me. |
| II | B | TSB | 10 | 36 | 30 | 34 | None | 100% Translucent lc. | None |
| III | | | 5 | 25 | 51 | 24 | 23% Hazy lc. | 19 + 46% Translucent lc. | 12% Emulsion |
| IV | | NaCl | 5 | 26 | 48 | 26 | 4% Translucent lc. | 32% Hazy lc. | 63% Translucent lc. |
| V | | | 2 | 24 | 52 | 24 | 8% Hazy lc. | 77% Translucent lc. | 15% Emulsion |
| III | C | TSB | 10 | 34 | 32 | 34 | 19% Emulsion | 69% Translucent lc. | 12% Emulsion |
| IV | | | 5 | 34 | 48 | 28 | 16% Emulsion | 59 + 21% Hazy lc. | 4% Emulsion |
| V | | NaCl | 5 | 36 | 37 | 27 | 26% Translucent lc. | — | 74% Hazy lc. |
| VI | | | 2 | 36 | 38 | 26 | 47% Translucent me. | 48% Hazy lc. | 5% Emulsion |

EXAMPLE 6

Oil recovery by liquid crystals was also examined using a number of different types of surfactants and their mixtures exemplified as follows. A translucent, flow birefringent mixture based on a 2.1% sodium i-dodecyl-o-xylene sulfonate (88% active) and 1.9% Igepal DM-730 from GAF Corp. (a tetradocosa-ethoxylated dinonyl phenol) produced a similar high and early oil recovery to the liquid crystal compositions described above. This shows that mixtures of sulfonates, particularly alkylbenzene sulfonates, and ethoxylated high alkyl phenols, particularly higher dialkyl substituted phenols are attractive surfactant mixtures for obtaining liquid crystalline compositions for oil recovery. As is generally the case, such mixtures could be used with or without polymers.

A liquid crystalline mixture of 4% Petrostep 465 and 2% Siponic L-7 which is an ethoxylated lauryl alcohol manufactured by Alcolac, Inc., also produced excellent oil recovery results.

We claim:

1. A process for recovering oil from an oil bearing formation in the presence of highly concentrated brine which comprises
   displacing oil with a middle phase primary displacement liquid containing lamellar liquid crystals which exhibit decreasing viscosities at increasing shear rates and consist essentially of
   (a) 0.5 to 10 vol.% of surfactant or combination of surfactants wherein at least one surfactant component is appropriately ethoxylated to obtain a balanced hydrophilic-lipophilic character, and providing a liquid crystalline middle phase containing oil and brine,
   (b) 0.1 to 20 vol.% of an oil, and
   (c) brine similar to that found in the formation and containing from about 5 to 30 wt.% of inorganic salts having sodium chloride as the major component and salts of divalent metals as minor components, said middle phase liquid containing lamellar liquid crystals being free from alcohol cosurfactant driving the liquid through the formation, and recovering the displaced oil.

2. The process of claim 1 wherein the primary displacement fluid contains a sulfonate surfactant appropriately ethoxylated to obtain a balanced hydrophilic-lipophilic character which provides a liquid crystalline middle phase containing oil and brine.

3. The process of claim 2 wherein the ethoxylated sulfonate surfactant is selected from the group consisting of $C_{15}$ to $C_{30}$ alkylaryl sulfonates or $C_{16}$ to $C_{40}$ aliphatic sulfonates.

4. The process of claim 1 wherein said primary displacement fluid contains an ethoxylated nonionic surfactant containing terminal hydroxy groups which is appropriately ethoxylated to obtain a balanced hydrophilic-lipophilic character which provides a liquid crystalline middle phase containing oil and brine.

5. The process of claim 4 wherein the ethoxylated nonionic surfactant is an ethoxylated alkylphenol.

6. An improved process for recovering oil from an oil bearing formation in the presence of highly concentrated brine by injecting into the formation a liquid containing an effective amount of surfactant to displace oil, driving the liquid through the formation and recovering the displaced oil, the improvement comprising using as the liquid a middle phase lamellar liquid crystal which exhibits decreasing viscosities at increasing shear rates and consists essentially of
(a) 0.5 to 10 vol.% of surfactant, wherein at least one surfactant component is appropriately ethoxylated to obtain a balanced hydrophilic-lipophilic character which provides a liquid crystalline middle phase containing oil and brine,
(b) 0.1 to 20 vol.% of an oil, and
(c) brine, similar to that found in the formation, containing 5 to 30 wt.% of inorganic salts having sodium chloride as the major component and salts of divalent metals as minor components, said middle phase lamellar liquid crystal being free from alcohol cosurfactant.

7. The process of claim 6 wherein the amount of oil is from 0.5 to 10 vol.%.

8. The process of claim 6 wherein the inorganic salts include $Ca^{2+}$ and $Mg^{2+}$.

9. The process of claim 6 wherein the surfactant is a sulfonate surfactant and a higher dialkyl phenol appropriately ethoxylated to obtain a balanced hydrophilic-lypophilic character.

10. The process of claim 9 wherein the sulfonate surfactant is an alkyl benzene sulfonate or an ortho-substituted alkyl benzene sulfonate.

11. The process of claim 6 wherein the oil is a distillate hydrocarbon oil.

12. The process of claim 6 wherein the surfactant is an anionic, cationic, nonionic, amphoteric surfactant, or mixtures thereof.

13. The process of claim 12 wherein the anionic surfactant is a sulfonate, sulfate or ester of phosphorus acid.

14. The process of claim 13 wherein the sulfonate is $C_{18}$ to $C_{56}$ alkylaryl or $C_{16}$ to $C_{40}$ aliphatic sulfonate.

15. The process of claim 13 wherein the sulfate is $C_{12}$ to $C_{40}$ aliphatic sulfate or a sulfated ethoxylated higher alcohol or alkyl phenol where the alkyl moiety of the alcohol or phenol is from $C_{12}$ to $C_{36}$ and $C_{12}$ to $C_{60}$, respectively.

16. The process of claim 13 wherein the ester is a $C_{12}$ to $C_{40}$ ester of a phosphorus acid or a phosphated ethoxylated $C_{12}$ to $C_{40}$ alcohol.

17. The process of claim 12 wherein the cationic surfactant is an ethoxylated derivative of $C_{12}$ to $C_{40}$ aliphatic amine, $C_{12}$ to $C_{40}$ diamine or triamine, $C_{12}$ to $C_{30}$ ammonium, $C_{13}$ to $C_{40}$ quaternary aliphatic amine or quaternary phosphonium salt having from 1 to 4 $C_{12}$ to $C_{40}$ aliphatic groups.

18. The process of claim 17 wherein cationic surfactant is ethoxylated with from 2 to 30 moles of ethylene oxide.

19. The process of claim 12 wherein the nonionic surfactant is an ethoxylated $C_{12}$ to $C_{40}$ alcohol.

20. The process of claim 12 wherein the nonionic surfactant is a higher dialkyl phenol appropriately ethoxylated to obtain a surfactant of balanced hydrophilic-lipophilic character of the formula

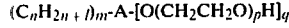

where n is from 1 to 30, A is benzene, napthalene or diphenyl, p is 2 to 30, q is 1 or 2 and m is 2 to 5 with the proviso that there are two $C_{12}$ to $C_{30}$ alkyl chains.

21. The process of claim 12 wherein the surfactant contains an appropriately ethoxylated ammonium component terminated by hydroxy groups to obtain said balanced hydrophilic-lipophilic character.

22. The process of claim 12 wherein the surfactant comprises a mixture of a petroleum sulfonate and ethoxylated surfactant.

23. The process of claim 12 wherein the anionic surfactant component is an ortho-substituted alkyl benzene sulfonate and the balanced hydrophilic-lipophilic character of the surfactant mixture is obtained by using an appropriately ethoxylated higher dialkyl phenol nonionic surfactant.

24. An improved process for recovering oil from an oil bearing formation by injecting into the formation a liquid containing an effective amount of a surfactant to displace oil, driving the liquid through the formation and recovering the displaced oil, the improvement comprising
using as the liquid a middle phase lamellar liquid crystal which exhibits decreasing viscosities at increasing shear rates and consists essentially of
(a) 0.5 to 10 vol.% of a combined surfactant biamphiphilic salt and composed of surfactant ions of anionic surfactants and cationic surfactants and produced by the combination of anionic surfactants and cationic surfactants wherein at least one surfactant component is appropriately ethoxylated to obtain a balanced hydrophilic-lipophilic character which provides a liquid crystalline middle phase containing oil and brine.
(b) 0.1 to 20 vol.% of an oil, and
(c) brine, similar to that found in the formation, containing from 5 to 30 wt.% inorganic salts having sodium chloride as the major components and salts of divalent metals as minor components, said middle phase lamellar liquid crystal being free from alcohol cosurfactant.

25. An improved process for recovering oil from an oil bearing formation by injecting into the formation a liquid containing an effective amount of a surfactant to displace oil, driving the liquid through the formation and recovering the displaced oil, the improvement comprising
using as the liquid a lamellar liquid crystal which exhibits decreasing viscosities at increasing shear rates and consists essentially of
(a) 0.5 to 10 vol.% of a combined surfactant of the formula

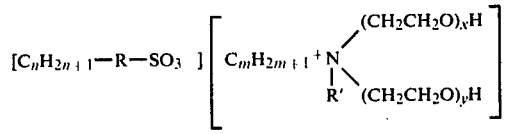

wherein R is phenyl, tolyl or xylyl; R' is H or $CH_3$; n is 12 to 40, m is 12 to 36 and x+y is 2 to 30;
(b) 0.1 to 20 vol.% of an oil; and
(c) brine containing from 5 to 30 wt.% of inorganic salts having sodium chloride as the major component and salts of divalent metals as minor components.

26. An improved process for recovering oil from an oil bearing formation by injecting into the formation a liquid containing an effective amount of a surfactant to displace oil, driving the liquid through the formation and recovering the displaced oil, the improvement comprising using as the liquid a lamellar liquid crystal which exhibits decreasing viscosities at increasing shear rates and consists essentially of
(a) 7 vol.% of Loudon oil;
(b) 3 wt.% of a combined surfactant of the formula
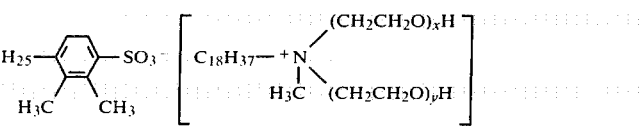
where $x + y = 7$
(c) brine containing 10 wt.% inorganic salts including about 9% sodium chloride and about 1% salts of divalent metals.
* * * * *